(12) United States Patent
Rousseau et al.

(10) Patent No.: US 11,897,214 B2
(45) Date of Patent: Feb. 13, 2024

(54) METHOD AND SYSTEM FOR MANUFACTURING AN OPTICAL LENS HAVING AN ELECTRONIC COMPONENT

(71) Applicant: Essilor International, Charenton-le-Pont (FR)

(72) Inventors: Denis Rousseau, Charenton-le-Pont (FR); Ludovic Jouard, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 753 days.

(21) Appl. No.: 16/618,565

(22) PCT Filed: Jun. 7, 2018

(86) PCT No.: PCT/EP2018/065087
§ 371 (c)(1),
(2) Date: Dec. 2, 2019

(87) PCT Pub. No.: WO2018/224617
PCT Pub. Date: Dec. 13, 2018

(65) Prior Publication Data
US 2020/0147907 A1    May 14, 2020

(30) Foreign Application Priority Data
Jun. 9, 2017    (EP) ..................... 17305695

(51) Int. Cl.
*B29D 11/00*    (2006.01)
*G02C 7/02*    (2006.01)
(Continued)

(52) U.S. Cl.
CPC ........ *B29D 11/00817* (2013.01); *B24B 9/148* (2013.01); *B29D 11/00942* (2013.01);
(Continued)

(58) Field of Classification Search
CPC ........ B29D 11/00817; B29D 11/00942; G02C 7/02; G02C 11/10; B24B 9/148; B24B 13/0055
See application file for complete search history.

(56) References Cited

U.S. PATENT DOCUMENTS 6,110,029 A    8/2000 Gottschald et al.
6,619,799 B1    9/2003 Blum et al.
(Continued)

FOREIGN PATENT DOCUMENTS

CN    101479644 A    7/2009
CN    104781987 A    7/2015
(Continued)

OTHER PUBLICATIONS

International Search Report dated Aug. 20, 2018 in PCT/EP2018/065087 filed on Jun. 7, 2018, 6 pages.
(Continued)

*Primary Examiner* — Mathieu D Vargot
(74) *Attorney, Agent, or Firm* — Oblon, McClelland, Maier & Neustadt, L.L.P.

(57) ABSTRACT

A method of manufacturing an optical lens including at least one electronic component. The method includes providing a mechanical reference system on an optical lens blank, the optical lens blank being configured to be processed to form the optical lens, providing edging data configured to be used to edge the optical lens blank to form the optical lens, and embedding the at least one electronic component in the optical lens based on edging data and on the mechanical reference system.

9 Claims, 2 Drawing Sheets

(51) Int. Cl.
  G02C 11/00 (2006.01)
  B24B 9/14 (2006.01)
  B24B 13/005 (2006.01)
  B29L 11/00 (2006.01)

(52) U.S. Cl.
  CPC .............. G02C 7/02 (2013.01); G02C 11/10 (2013.01); *B24B 13/0055* (2013.01); *B29L 2011/0016* (2013.01)

(56) References Cited

U.S. PATENT DOCUMENTS

| | | |
|---|---|---|
| 9,323,074 B1 | 4/2016 | Blum et al. |
| 9,411,173 B1 | 8/2016 | Blum et al. |
| 2002/0140899 A1 | 10/2002 | Blum et al. |
| 2004/0051846 A1 | 3/2004 | Blum et al. |
| 2004/0056986 A1 | 3/2004 | Blum et al. |
| 2004/0084790 A1* | 5/2004 | Blum .................. G02F 1/13452 |
| | | 351/159.03 |
| 2005/0168687 A1 | 8/2005 | Blum et al. |
| 2005/0206844 A1 | 9/2005 | Blum et al. |
| 2005/0213027 A1 | 9/2005 | Blum et al. |
| 2005/0219460 A1 | 10/2005 | Blum et al. |
| 2005/0270481 A1 | 12/2005 | Blum et al. |
| 2006/0126698 A1 | 6/2006 | Blum et al. |
| 2006/0139570 A1 | 6/2006 | Blum et al. |
| 2006/0192918 A1 | 8/2006 | Blum |
| 2006/0238701 A1 | 10/2006 | Blum |
| 2007/0081126 A1 | 4/2007 | Blum et al. |
| 2007/0091258 A1 | 4/2007 | Blum et al. |
| 2007/0146627 A1 | 6/2007 | Blum et al. |
| 2007/0173182 A1 | 7/2007 | Curcher |
| 2007/0216862 A1 | 9/2007 | Blum et al. |
| 2007/0296918 A1 | 12/2007 | Blum et al. |
| 2008/0026679 A1* | 1/2008 | Siders .................... B24B 13/06 |
| | | 451/5 |
| 2008/0316425 A1 | 12/2008 | Blum et al. |
| 2009/0033866 A1 | 2/2009 | Blum et al. |
| 2009/0079938 A1 | 3/2009 | Blum et al. |
| 2010/0065625 A1 | 3/2010 | Sabeta |
| 2011/0037946 A1 | 2/2011 | Blum et al. |
| 2011/0279772 A1 | 11/2011 | Blum et al. |
| 2012/0008094 A1 | 1/2012 | Blum et al. |
| 2013/0250191 A1 | 9/2013 | Blum et al. |
| 2014/0036226 A1 | 2/2014 | Blum et al. |
| 2014/0218647 A1 | 8/2014 | Blum et al. |
| 2014/0364039 A1 | 12/2014 | Eurin |
| 2015/0236428 A1 | 8/2015 | Caratelli et al. |
| 2016/0192836 A1 | 7/2016 | Blum et al. |
| 2016/0363783 A1 | 12/2016 | Blum et al. |
| 2017/0010480 A1 | 1/2017 | Blum et al. |
| 2017/0082872 A1 | 3/2017 | Berthelot et al. |
| 2017/0307905 A1 | 10/2017 | Blum et al. |
| 2018/0272597 A1* | 9/2018 | Biskop .................. B29C 64/223 |

FOREIGN PATENT DOCUMENTS

| | | |
|---|---|---|
| DE | 26 19 985 A1 | 11/1977 |
| FR | 2 686 537 A1 | 7/1993 |
| JP | 7-142554 A | 6/1995 |
| RU | 2 395 108 C2 | 7/2010 |
| WO | WO 2008/142204 A1 | 11/2008 |
| WO | WO 2013/087504 A1 | 6/2013 |

OTHER PUBLICATIONS

Combined Chinese Office Action and Search Report dated Dec. 10, 2021 in Chinese Patent Application No. 201880036725.2 (with unedited computer-generated English translation), 16 pages.

* cited by examiner

METHOD AND SYSTEM FOR MANUFACTURING AN OPTICAL LENS HAVING AN ELECTRONIC COMPONENT

FIELD OF THE INVENTION

The invention relates to a method for manufacturing an optical lens comprising at least one electronic component. The invention also relates to a system for the execution of such a method.

BACKGROUND OF THE INVENTION

Electronic spectacle have an important and rapid growth. More and more electronic spectacle are being develop with a greater variety of different electronic elements.

The electronic elements can be both embedded in an electronic spectacle frame or directly in an electronic lens which can be in communication with the electronic spectacle frame wherein the electronic lens is mounted.

Electronic spectacle frame and/or electronic lenses may comprise many different electronic elements such as sensors, displays, active lenses, batteries, processors for local processing and communication devices, and charging devices.

With the growing interest in electronic spectacles, it has become important to provide a solution that facilitates the integration of electronic components in a lens.

It is now well known to embed electronic elements after the edging process of a lens have been finished.

However, an edged lens is a small component, thin and flexible and consequently not easy to handle for special processing like printing electronic components or adding electronic components in the lens.

Therefore, there is a need for a solution allowing to integrate electronic elements into the lens.

An aim of the present invention is to propose such solution.

SUMMARY OF THE INVENTION

To this end, the invention proposes a method for manufacturing an optical lens comprising at least one electronic component, the method comprising:
  providing a mechanical reference system on an optical lens blank, the optical lens blank being configured to be processed to form the optical lens;
  providing edging data configured to be used to edge the optical lens blank to form the optical lens;
  embedding the at least one electronic component in the optical lens based on edging data and on the mechanical reference system.

Advantageously, such method allows the handling of the lens for operations that can be done in an edging device or another device, without the need of calibration and/or visual detection of the particular zones of the lens where the electronic component will be embedded, for example where a printing and posing process will occur.

According to further embodiments that can be considered alone or combined according to all the possible combinations:
  the method further comprises removably attaching a blocking piece to a surface of the optical lens blank, the blocking piece forming the mechanical reference system;
  the method further comprises providing lens data with respect to the mechanical reference system, lens data comprising:
    the position of the optical centre of the optical lens to be manufactured, and/or
    the orientation of the optical axis of the optical lens to be manufactured, and/or
    the optical power of the optical lens to be manufactured, and/or
    the position of the contour of the optical lens to be manufactured, and/or
    the thickness of the optical lens to be manufactured for a plurality of points of the surface of the optical lens blank, and/or
    the curve radius of a first and a second surface of the lens to be manufactured;
  and the at least one electronic component are further embedded in the optical lens based on lens data;
  embedding the at least one electronic component in the optical lens comprises at least one of the following steps:
    printing the at least one electronic component on a surface of the optical lens;
    embedding the at least one electronic components into the optical lens;
    printing a fixing material configured to position the at least one electronic component on a surface of the optical lens;
  the method further comprises printing a coating to protect at least a predetermined areas of the electronica component embedded in the optical lens;
  the method further comprises printing by a 3D printing process based on the mechanical reference system;
  the method further comprises:
    providing data of the at least one electronic component;
    processing the optical lens blank based on data of the at least electronic component, on edging data and on the mechanical reference system to form a cavity for receiving the at least one electronic component;
  the method further comprises edging the optical lens blank based on edging data and on the mechanical reference system to form the optical lens before embedding the at least one electronic component in the optical lens;
  the method further comprises forming another reference system on a surface of the optical lens, and the at least one electronic component is embedded in the optical lens based on edging data and on the other reference system;
  the other reference system is formed during edging the optical lens blank;
  the method further comprises surfacing at least a surface of the optical lens blank, and wherein the another reference system is formed during surfacing the optical lens blank;
  the at least one electronic component is embedded in the optical lens in an edging device configured to edge the optical lens blank to form the optical lens.

The invention also relates to a system for execution of a method of manufacturing an optical lens comprising at least one electronic component according to the invention.

Another object of the invention relates to an optical lens comprising at least one electronic component manufactured according to a method of manufacturing according to the invention.

BRIEF DESCRIPTION OF THE DRAWINGS

Embodiments of the invention will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF PREFERRED EMBODIMENTS

An object of the invention relates to a method of manufacturing an optical lens comprising at least one electronic component and to the corresponding optical lens manufactured according to this method. Such optical lens, also called electronic optical lens, can be embedded for example in a head-mounted device.

Figure 1:
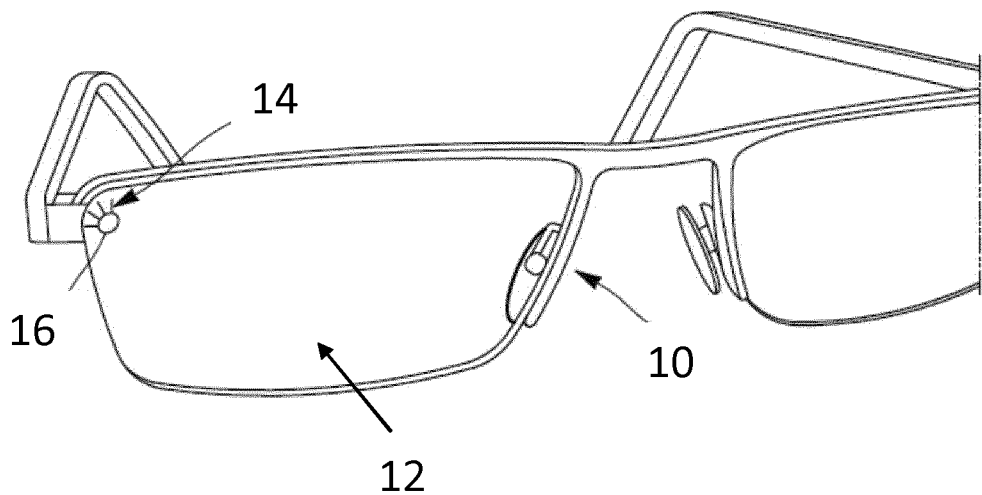
FIG. 1 is a schematic representation of a head mounted device comprising an electronic optical lens manufactured according to an embodiment of the invention.

Such a head-mounted system is an electro-optical device worn on the head by a wearer. Usually such system is electronically controlled so as to switch between different stages or to display information to the wearer. As illustrated on FIG. 1, a head mounted system 10 usually presents like a spectacle frame with at least one electronically controlled spectacle lens 12. The electronic optical lens 12 comprises at least one electronic component, for example electronic wires 14 and/or other electronic elements 16. For example, the electronic elements 16 can be sensors.

In the sense of the invention, optical lens should be understood as any part adapted to make a lens with integrated electronics. For example, the method can be used for manufacturing two mineral shells configured to be assembled together in order to form an electrochromic lens. Electronic components can be embedded on at least one of the mineral shell.

Figure 2:
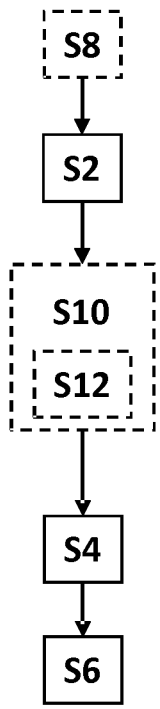
FIG. 2 is an illustration of a chart-flow of a method for manufacturing an optical lens comprising at least one electronic component according to the invention.

With reference to FIG. 2, the method of manufacturing an optical lens comprising at least one electronic component according to the invention comprises at least:
a mechanical reference system providing step S2,
an edging data providing step S4, and
an electronic component embedding step S6.

During the mechanical reference system providing step S2, a mechanical reference system is provided on an optical lens blank, which is configured to be processed to form the optical lens. In the sense of the invention, "a mechanical reference system" is a physical object defining a frame of reference, such as one or more markings, nicks, wedges and the like.

Then, edging data configured to be used to edge the optical lens blank to form the optical lens are provided during the step S4.

The method further comprises edging the optical lens blank based on edging data and on the mechanical reference system to form the optical lens before embedding the at least one electronic component in the optical lens.

During the electronic component embedding step S6, the or each electronic component are embedded in the optical lens based on edging data and on the mechanical reference system.

According to an embodiment, the electronic component can be printed on a surface of the optical lens. More particularly, the printing process can be a 3D printing process based on the mechanical reference system.

According to another embodiment, the electronic component is placed on a surface of the optical lens.

According to another embodiment, the electronic component is embedded into the optical lens, i.e. between the two surfaces of the optical lens.

According to another embodiment, a fixing material configured to position at least one electronic component can be advantageously printed on a surface of the optical lens, for example glue or soldering material.

Figure 3:
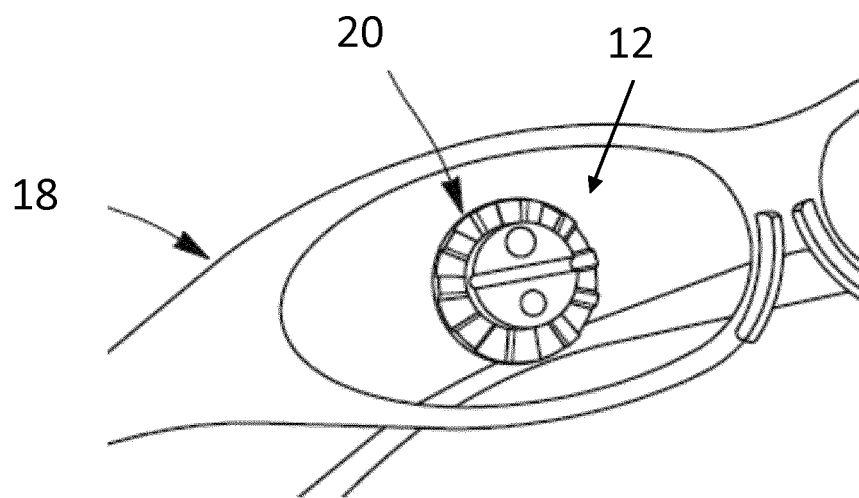
FIG. 3 is a schematic representation of a blocking piece attached on an optical lens.

Preferably, the method further comprises a blocking piece attaching step S8 before the electronic component embedding step S6, during which a blocking piece is removably attached to a surface of the optical lens blank. FIG. 3 illustrates an electronic optical lens 12 manufactured by a method according to the invention and mounted in a spectacle frame 18. The blocking piece 20 is attached on the optical lens and can also be used during the step of mounting the electronic optical lens in the frame 18.

Advantageously, the blocking piece is attached, for example stuck on a surface of the optical lens at the beginning of the edging process and forms the mechanical reference system which can be used for further processes and notably for the integration of electronic components to the optical lens. Thus, all information about the edging process and the optical lens shape is memorized in the edging device. The edging data comprises at least these information and are used during the embedding step S6. Thus, the blocking piece forms advantageously an absolute reference on the lens.

The blocking piece can be attached on a convex surface or on a concave surface of the lens.

For example, these edging data can be used to conduct supplementary processes on the edged lens, typically printing conductive wires and positioning and placing electronic components to be soldered or inserted directly into the optical lens.

Before these processes, the edging device can also make special operations to enable the printing process and the component placing process, for example edging a special shape, like a hole for the electronic components or a path for electronic wires to be printed.

Advantageously, such a special shape is realized on the lens during the edging step. The special shape can also be a countersink, a groove, an alteration of the polished surface and/or an engraving on the convex, concave or both surfaces of the optical lens and/or on the edge of the optical lens. For example, such special shape is advantageously used to form a cavity in which electronic components can be encapsulated.

The edging data comprises at least the mechanical information about the blocking piece position relative to the optical lens. Thus, there is no need for calibration or measuring of the edged lens to determine where to place the printed circuits and/or electronic components. The use of one single database as mechanical reference is a good advantage and will simplify the complete process.

To this end, the method can further comprise a step for providing data of the or each electronic component to be embedded in the optical lens and a step for processing the optical lens blank based on data of the at least electronic component, on edging data and on the mechanical reference system to form a cavity for receiving the at least one electronic component.

Advantageously, the method can further comprise a lens data providing step S10 during which lens data with respect to the mechanical reference system are provided and the or each electronic component is further embedded in the optical lens based on these lens data. More particularly, positions of the electronic components to be embedded are determined based on lens data. Lens data can comprise:

- the position of the optical centre of the optical lens to be manufactured, and/or
- the orientation of the optical axis of the optical lens to be manufactured, and/or
- the optical power of the optical lens to be manufactured, and/or
- the position of the contour of the optical lens to be manufactured, and/or
- the thickness of the optical lens to be manufactured for a plurality of points of the surface of the optical lens blank, and/or
- the curve radius of a first and a second surface of the lens to be manufactured.

The lens data providing step S10 can further comprise a lens data measuring step S12 during which lens data are measured with respect to the mechanical reference system. More particularly, lens data can be advantageously measured with respect to the mechanical reference system during an edging step, for example. Then, some of these lens data can be used by a system configured for execution of the electronic component embedding step S6. For example, the curve radius of the lens and the thickness of the optical lens can be very useful for the placing of the or each electronic component in the optical lens. Indeed, most of the time electronics components must be placed on a «flat» surface, i.e. a surface that is perpendicular to the z axis of a placing system. Data from an edging system can be used to achieve that position.

The measurements made by an edging device, configured to implement the edging step, can be made especially for the purpose of the electronic component embedding step S6. For example, an electronic printing device configured to print electronic components on the lens can require a special measurement from the edging device to measure precisely the position of the surface on which wires must be printed.

Advantageously, the method can further comprise printing a coating on a surface of the optical lens to protect at least a predetermined areas of the electronic component embedded in the optical lens.

According to an embodiment, the method advantageously further comprises forming another reference system on a surface of the optical lens, and the at least one electronic component is embedded in the optical lens based on edging data and on the other reference system. The other reference system can be formed during edging the optical lens blank or during surfacing the optical lens blank.

Another object of the invention relates to a system for the execution of a method of manufacturing an optical lens comprising at least one electronic component according to the invention.

According to an embodiment, the system is an edging device configured to edge the optical lens blank to form the optical lens. The or each electronic component are embedded in the optical lens directly in the edging device.

More particularly, the edging device can comprise a system arranged and configured to print the electronic wires and electronic components on the lens.

Furthermore, the edging device can comprise a pick and place electronic component tool, which is arranged and configured to directly pick and place each electronic component to be embedded on the lens.

Advantageously, a single device is used for the edging step and the embedding step.

According to another embodiment, the system for the execution of the method according to the invention comprises an edging device for the execution of the edging step and another device for the execution of the embedding step. Advantageously, the blocking piece is attached on a surface of the optical lens at the beginning of the edging step and is kept on the edged lens to be used in the other device for the embedding of the electronic components.

Advantageously, the embedding step is thus not pollute by the edging step which can be quite dirty.

For example, the other device can comprise a printing device and a placing device. In this case, the blocking device is firstly stuck on a surface of the optical lens blank. The optical lens blank can have a special pre-process for future electronic components. Then, the optical lens blank is edged with a well-known edging process in an edging device. Special shape and/or holes can be added for the electronic component to be embedded. After the edging step, the edged lens is placed in the printing device thanks to the blocking piece and edging data are received by the printing device. Then, electronic wires and printable electronic components are printed on the optical lens based at least on the edging data. After the printing step, the optical lens is placed in the placing device thanks to the blocking piece and edging data are received by the placing device. Then, electronic components are placed in the optical lens based at least on the edging data. Finally, the blocking piece is removed from the optical lens or used for another process.

Another advantage of such embodiment is that the mechanical referential system formed by the blocking piece is non dependent of the accuracy of the edging step.

According to other embodiments compatible with the previous ones, the system for the execution of the method according to the invention can further comprise a tracer, an optical lens blocker and/or a drilling device.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

For example, a predetermined pattern can also be realized on the optical lens during a surfacing process, for example if the optical lens is realized with a digital surfacing process. The optical lens is then edged and this predetermined pattern can form the mechanical reference system used during the electronic component embedding step. Such predetermined pattern is advantageously placed in a manner that it is not visible when the optical lens is mounted in the frame.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of manufacturing an optical lens comprising at least one electronic component, a mechanical reference system being provided on an optical lens blank, the optical lens blank being configured to be processed to form the optical lens, the method comprising:

obtaining edging data configured to be used to edge the optical lens blank to form the optical lens;

edging the optical lens blank based on the edging data and on the mechanical reference system to form the optical lens; and embedding the at least one electronic component in the optical lens based on the edging data and on the mechanical reference system, wherein the embedding is performed by an edging device that comprises a tool arranged and configured to pick and place the at least one electronic component in the optical lens.

2. The method according to claim 1, further comprising removably attaching a blocking piece to a surface of the optical lens blank, the blocking piece forming the mechanical reference system.

3. The method according to claim 1, further comprising obtaining lens data with respect to the mechanical reference system, the lens data comprising:

a position of an optical centre of the optical lens to be manufactured, and/or an orientation of an optical axis of the optical lens to be manufactured, and/or an optical power of the optical lens to be manufactured, and/or a position of a contour of the optical lens to be manufactured, and/or a thickness of the optical lens to be manufactured for a plurality of points of the surface of the optical lens blank, and/or a curve radius of a first and a second surface of the optical lens to be manufactured, wherein the at least one electronic component is further embedded in the optical lens based on the lens data.

4. The method according to claim 1, further comprising printing a coating to protect at least a predetermined areas of the at least one electronic component embedded in the optical lens.

5. The method according to claim 1, further comprising:

obtaining data of the at least one electronic component; and processing the optical lens blank based on data of the at least one electronic component, on the edging data, and on the mechanical reference system to form a cavity for receiving the at least one electronic component.

6. The method according to claim 1, further comprising forming an other reference system on a surface of the optical lens, and the at least one electronic component is embedded in the optical lens based on edging data and on the other reference system.

7. The method according to claim 6, wherein the other reference system is formed during the edging of the optical lens blank.

8. The method according to claim 7, further comprising surfacing at least a surface of the optical lens blank, and wherein the other reference system is formed during surfacing the optical lens blank.

9. A system for manufacturing an optical lens comprising at least one electronic component, a mechanical reference system being provided on an optical lens blank, the optical lens blank being configured to be processed to form the optical lens, and edging data being provided that is configured to be used to edge the optical lens blank to form the optical lens, the system comprising:

an edging device configured to edge the optical lens blank based on the edging data and on the mechanical reference system to form the optical lens, and embed the at least one electronic component in the optical lens based on the edging data and on the mechanical reference system, wherein the edging device comprises a pick and place electronic component tool, which is arranged and configured to directly pick and place the at least one electronic component to be embedded in the optical lens.

* * * * *